Sept. 2, 1941.  A. SISCO  2,254,981
FISH LURE
Filed April 10, 1939
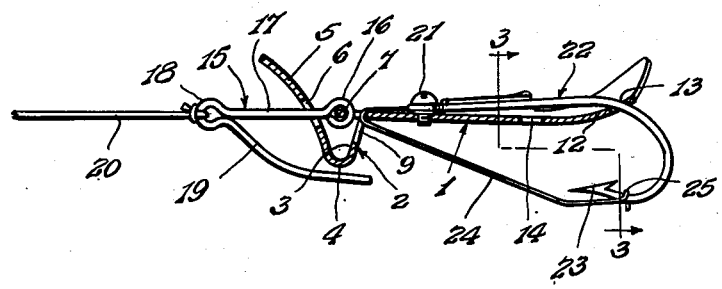
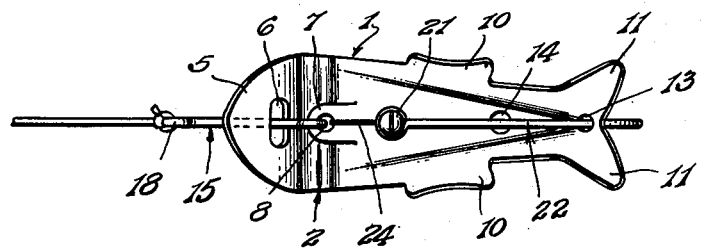
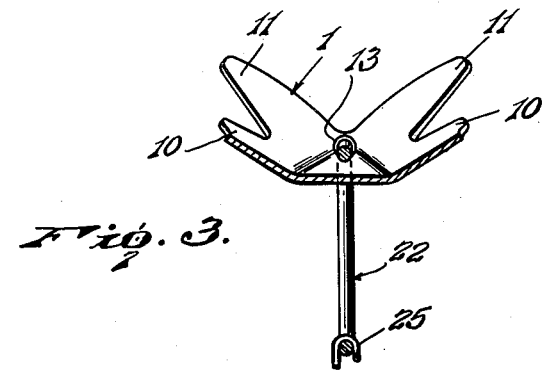
Inventor
Alexander Sisco.
By Lacey & Lacey
Attorneys Patented Sept. 2, 1941

2,254,981

UNITED STATES PATENT OFFICE 2,254,981

FISH LURE

Alexander Sisco, Kokomo, Ind.

Application April 10, 1939, Serial No. 267,071

7 Claims. (Cl. 43—39)

This invention relates to an improved fish lure.

One object of the invention is to provide a fish lure which will be so formed that it will trace an uneven or zigzag course when pulled through the water.

As another object, the invention seeks to provide a device of this character employing a body of such formation that the device will be caused to rise and skim the surface while trolling or retrieving.

A further object of the invention is to provide a fish lure which will be adaptable for under water use, if desired.

A further object of the invention is to provide a fish lure wherein means are provided serving the two-fold purpose of acting as a weed guard and providing attaching means for a line.

Another object of the invention is to provide a device of this nature the body of which is of such formation that it will impart a slight roll to the device as it is drawn through the water so that said body will cast off beams of light at various angles and thus attract fish.

And as a further object, the invention provides a fish lure which is of simple construction and which will be readily adaptable to manufacture in quantity cheaply.

Other and incidental objects of the invention, not specifically mentioned hereinabove, will become apparent during the course of the following description.

In the drawing forming a part of my application:

Figure 1 is a longitudinal sectional view.

Figure 2 is a top plan view.

Figure 3 is a transverse sectional view on the line 3—3 of Figure 1, looking in the direction indicated by the arrows.

Referring now more particularly to the drawing, wherein like numerals of reference will be seen to designate similar parts throughout the views, the numeral 1 indicates in general the body of my improved fish lure. As will be seen, the body 1 has a bowed forward portion shown generally at 2. The bowed portion 2 includes a downwardly extending wall 3, a bight portion 4 and an upwardly and forwardly curved front portion 5. The front portion is formed with a laterally extending slot 6. Medialy of the width of the body 1, adjacent the wall 3 of the bowed portion 2, a lug 7 is struck out. The lug 7 is apertured at 8 and said lug defines an opening 9 in the wall 3, which opening extends from its upper end downwardly substantially half of its height.

As best seen in Figures 2 and 3 of the drawing, the body is tapered in width toward its rear end and is provided with fins 10 and 11 at its opposite sides. Moreover, the fins 10 and 11 are bent upwardly at an angle of substantially 20° from the horizontal to define a bowed central and rear portion for the body. As best seen at 12 in Figure 1, the rear portion of the body 1 is curved upwardly. At 13 is shown an opening through which a hook to be hereinafter described, extends. Near its rear end or tail the body is provided with a working opening 14 which, in view of the fact that the body must be made with absolute accuracy, facilitates working of said body into proper shape.

Swingingly connected with the lug 7, and extending through the laterally extending slot 6, is a swivel 15. The swivel 15 has an eye 16 extending through the opening 8 and a shank portion 17 which terminates in an eye 18 at its outer end. The free end portion of the shank 17 is extended downwardly and curved rearwardly to form a weed guard 19. The eye 18 is adapted to receive a line 20.

As will be seen in Figure 1 of the drawing, the guard 19 extends past the bight portion 4 of the bowed portion of the body 1 in spaced relation thereto, so that weeds will be guided past the forward portion of the body and will be prevented from snagging or blocking movement of said forward portion of the body. The swivel 15 is preferably made of heavy wire.

In view of the fact that the swivel works in the slot 6 and is pivoted a short distance rearwardly of the slot and of the forward end of the portion 5, the body will be given a zigzag motion when being trolled or retrieved. It is also desired to call attention to the fact that as the portion 5 is upwardly and forwardly curved and the rear 12 of the body 1 is upwardly curved, the device will ride along the surface of the water. That is to say, the curved portions 5 and 12 will cause the forward end of the device to rise and the tail to move downwardly as said device is drawn along in the water. Moreover, as the body is bowed at its central and rear portions; that is to say, as the body is of substantially V-shape, said body will retain a substantially upright position when moving in the water. The fact that the body is V-shaped also provides reinforcement therefor so that danger of bending will be reduced to a minimum. The body will be caused to wobble from side to side when in motion and the highly polished surface of the fins will project light beams at various angles for luring fish to the hook carried by the device.

The body 1 is apertured near its forward end portion and internally threaded to receive a screw 21. The screw 21 secures the eye of a fish hook 22. The shank of the hook extends rearwardly of the body and through the opening 13, and thence downwardly so that the barb 23 thereof is disposed in spaced relation beneath the body substantially at its rear end.

A guard wire 24 is employed and this guard wire has one end secured under the screw 21 and extends forwardly and through the opening 9 and obliquely with respect to the body to a point in close proximity to the barb 23. The wire 24 has a latch 25 which engages about the hook adjacent the barb 23. It should be understood that the hook may be of any desired shape or construction.

Attention is directed to the fact that although the device is highly recommended as a surface spoon or lure, it may also be effectively employed as an under water lure. In view of the fact that the hook is disposed in the manner disclosed and the fact that the rear of the body is moved upwardly as the device is moving through the water, the hook will always pierce the under jaw of the fish.

It is believed that further description of the invention is unnecessary.

Having thus described the invention, what I claim is:

1. In a fish lure, a body having a bowed forward end portion including a forwardly and upwardly curved forward portion having a slot, a hook carried by the body, means for keeping weeds away from the hook, and a swivel swingingly connected with the body and extending through the slot, said swivel having an eye for receiving a line and being laterally movable in the slot for imparting a zigzag movement to the body in motion, said forwardly and upwardly curved portion of the bowed portion causing upward movement of the forward end of the body and downward movement of the rear end of said body in motion.

2. In a fish lure, a body having fins, said fins being disposed at an angle to the plane of the body and defining a substantially V-shape to the body toward the rear end thereof, a hook receiving opening in the body at its rear end, a hook carried by the body and extending through the opening and along the length of the body, means for securing the hook on the body at its forward end, the barbed end of said hook extending forwardly parallel with the body, said body being upwardly curved at its rear end, a bowed portion at the forward end of the body, said bowed portion having an upwardly and forwardly curved portion provided with a laterally extending slot, a lug carried by the body rearwardly of the upwardly and forwardly curved portion, and a swivel extending through the slot and swingingly connected with the lug, said swivel being laterally movable in the slot for imparting a zigzag movement to the body in motion in the water, said upwardly and forwardly curved portion of the bowed portion and said upwardly curved portion of the rear of the body effecting raising of the forward end and lowering of the rear end of said body when in motion in the water to move along the surface thereof.

3. In a fish lure, a body, a hook carried by the body, said body having a bowed portion terminating in an upwardly and forwardly curved portion, said last mentioned portion having a slot, attaching means on the body, and a swivel swingingly connected with the attaching means and laterally movable in the slot for imparting a zigzag movement to the body in motion in the water, said swivel having an eye for the reception of a line and having a shank extending to define a weed guard for the body.

4. In a fish lure, a body shaped to simulate the shape of a minnow and including a bowed forward portion terminating in an upwardly and forwardly curved forward portion having a laterally extending slot medially of its height, said body being struck to define a lug rearwardly of the bowed portion, a swivel connected to the lug and extending through the laterally extending slot, said swivel being adapted for lateral movement in the slot for imparting a zigzag movement to the body when moving in the water, said swivel having a shank terminating in an eye for the reception of a fish line, said shank being extended past the eye and past the bowed portion in spaced relation thereto to define a weed guard, a hook extending longitudinally of the body and through one end thereof, said hook having its barb disposed in parallel relation to the body, means securing the eye of the hook to the body near its forward end, and a guard wire carried by the body and extending obliquely with respect thereto, said guard wire having its free end portion adapted removably to engage the hook for providing protection against weeds.

5. As a new article of manufacture, a fish lure comprising a body having a bowed portion and an upwardly and forwardly extending curved portion, the body having integral therewith medially of its width a struckout attaching lug extending above the bowed portion, said body having fins extending in angular relation with respect to the plane of the body.

6. In a fish lure, a body having a bowed portion terminating in an upwardly and forwardly curved portion, said curved portion being formed with a slot, and a swivel swingingly connected with the body above the bowed portion and laterally movable in the slot for imparting a zigzag movement to the body in motion in water.

7. In a fish lure, a body having a slot, and a swivel swingingly connected with the body and laterally movable in the slot, said swivel having a shank extended to define a weed guard for the body.

ALEXANDER SISCO.